S. SELDEN & M. GRISWOLD, Jr.
Stove-Pipe Damper.
No. 161,064. Patented March 23, 1875.
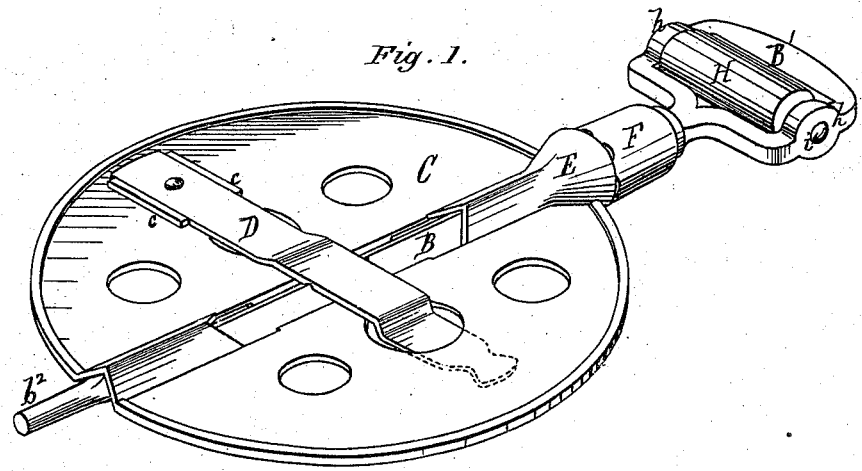
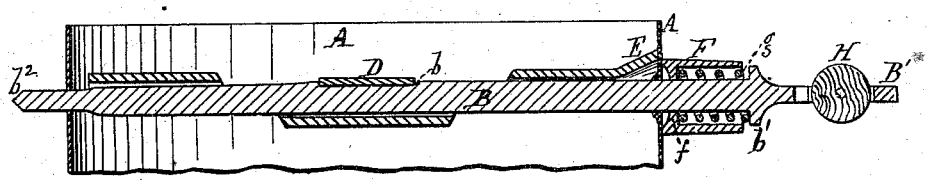
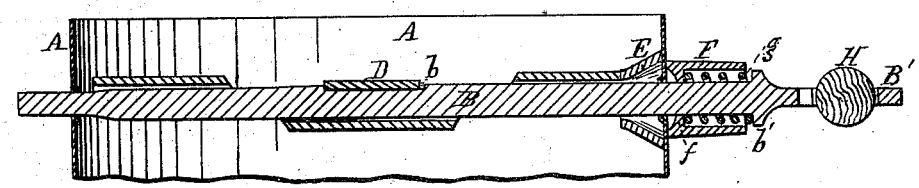

UNITED STATES PATENT OFFICE.

SAMUEL SELDEN AND MATTHEW GRISWOLD, JR., OF ERIE, PENNSYLVANIA.

IMPROVEMENT IN STOVE-PIPE DAMPERS.

Specification forming part of Letters Patent No. 161,064, dated March 23, 1875; application filed January 4, 1875.

*To all whom it may concern:*

Be it known that we, SAMUEL SELDEN and MATTHEW GRISWOLD, Jr., of the city and county of Erie and State of Pennsylvania, have invented certain new and useful Improvements in Stove-Pipe Dampers, of which the following is a full, clear, and exact description, reference being had to the accompanying drawing making part of this specification, in which—

Figure 1 is a perspective view of the improved damper. Fig. 2 is a section through the same, taken on a line with the center of the spindle. Fig. 3 is a similar view, showing a modification in the inner conical thimble.

Similar letters of reference denote corresponding parts in all the figures.

The invention relates, first, to the means for uniting the damper to the spindle, for preventing end play; secondly, to the means for holding the damper at any desired angle of adjustment; and consists, first, in the combination, with the damper, of a spring-latch or locking-plate, which engages with a notch or socket in the spindle, and prevents end movement of the damper and spindle relatively to each other, as hereinafter explained; second, in providing the damper, on its side adjacent to the handle, with a thimble, surrounding or partly surrounding the spindle-bearing in the pipe, to operate in combination with a spring thimble or sleeve surrounding the spindle outside the pipe, said thimbles serving by their frictional grasp of the pipe between them to prevent accidental displacement or rotation of the damper.

In the drawing, A represents a section of pipe perforated to form bearings for the damper spindle or shaft B, upon which the damper C is secured by means of a central angular socket formed therein in the usual or any preferred manner. The damper C is provided on one side with lips or flanges at *c c*, forming a socket for the reception of a yielding or spring plate, D, which is riveted to the damper C, or, if preferred, this spring-plate may be cast in one piece with the damper, forming an elastic tongue or spur, extending through a central opening therein. This plate D crosses the spindle-socket at right angles or nearly so, and at or near midway the length of said socket, and when the spindle is in place in the socket enters a notch at *b* therein, and effectually prevents end movement of the spindle relatively to the damper. The spindle-socket at the edge of the damper adjacent to the handle is enlarged at E, forming a truncated semi-cone or thimble, the outer enlarged end or base of which rests against the inner face of the pipe outside of the jagged edge of the spindle-bearing in the pipe, in such manner that such edge shall not interfere with the free movement of the damper. This thimble, instead of being cast in one piece with the damper, may be cast separately therefrom in the form of a truncated cone, entirely surrounding the spindle, and matching a socket formed in the damper for its reception, as shown in Fig. 3. Upon the spindle B, outside of the pipe, is placed a sleeve, F, the inner corrugated end of which rests against the pipe A. The central perforation of this sleeve, outside of its bearing *f* on the spindle, is enlarged to receive a spiral spring, *g*, the inner end of which rests against the bearing-shoulder *f*, and the outer end against a shoulder or collar, $b^1$, formed on the spindle B. The tension of the spring *g* is exerted to draw the spindle outward, and to press the sleeve F snugly against the pipe, and the damper being firmly fastened to the spindle, as explained, it moves with the spindle until the thimble E is drawn into contact with the inner face of the pipe, when the thimbles E and F clamp the pipe snugly between them, and by their frictional grasp, prevent accidental displacement or rotation of the damper, which is thus firmly held at any angle of adjustment at which it may be set. The spindle B, outside of the collar $b^1$, is provided with an open rectangular handle-loop, B', within which is placed a roll or block of wood, H, forming a handle of non-conducting material, by means of which the damper may, at all times, be safely manipulated. The end bars *h* of this loop are expanded in width, and perforated to receive pins *i*, which may be driven through the perforations into the ends of the block or roll for holding it in place, or, if preferred, a bolt or rivet may be employed, passing entirely through the roll or block H longitudinally, and through the bars *h*, either construction effectually preventing the accidental displacement or dropping out of the roll or block from shrinkage due to its exposure to heat in its application, as described, this being one of the principal difficulties in the way of the employment of the wooden handles or plugs, as heretofore applied. This construction or manner of applying the non-conducting handle also permits of its ready renewal, when, from any cause, it becomes necessary. The end $b^2$ of the spindle is pointed or made tapering for convenience in entering the spindle, which, at its point of bearing in the pipe, and outside thereof, is made cylindrical in form, while the portion entering the socket in the damper is squared or made polygonal in form, conforming to the shape of the socket, for insuring the rotation of the damper with the spindle.

Having now described our improvement, what we claim as new, and desire to secure by Letters Patent, is—

1. The spring plate or tongue D, attached to the damper, in combination with the notched or recessed spindle B, substantially as and for the purpose set forth.

2. The combination, with the thimble E, of the sleeve F, arranged and operating relatively to the spindle-bearing in the pipe A, substantially as described.

3. The thimble or sleeve F and spring $g$, applied to the spindle B, and operating in combination with the damper C, to hold the pipe with a frictional grasp, substantially as and for the purpose set forth.

SAMUEL SELDEN.
MATTHEW GRISWOLD, JR.

Witnesses:
CHAS. D. MARVIN,
S. S. SPENCER.